United States Patent [19]

Tiilikka

[11] 4,427,429

[45] Jan. 24, 1984

[54] METHOD FOR THE OPALIZATION OF GLASS

[75] Inventor: Antero Tiilikka, Riihimäki, Finland

[73] Assignee: Riihimäen Lasi Oy, Riihimäki, Finland

[21] Appl. No.: 367,799

[22] Filed: Apr. 12, 1982

[30] Foreign Application Priority Data

Apr. 15, 1981 [FI] Finland .................................. 811168

[51] Int. Cl.³ .......................... C03B 5/18; C03B 5/23; C03C 1/04
[52] U.S. Cl. .......................................... 65/33; 65/66; 65/69; 65/121; 65/134; 501/32
[58] Field of Search ................ 65/33, 66, 69, 95, 121, 65/134; 501/17, 18, 32

[56] References Cited

U.S. PATENT DOCUMENTS

| | | | |
|---|---|---|---|
| 3,024,121 | 3/1962 | Hagedorn | 65/121 |
| 3,077,414 | 2/1963 | Wiker | 501/32 X |
| 3,343,935 | 9/1967 | Keefer et al. | 65/121 |
| 3,709,705 | 1/1973 | Hagedorn | 501/32 |

*Primary Examiner*—Richard V. Fisher
*Attorney, Agent, or Firm*—Holman & Stern

[57] ABSTRACT

The invention comprises a method for the continuous opalization of glass, wherein an opalescent agent is added to the molten glass in the forehearth situated between a glass furnace and the automatic forming machine, followed by adjustment of the glass temperature so that the opalescence takes place either before the automatic machine or at the latest, during the annealing which is carried out after the automatic machine.

12 Claims, No Drawings

METHOD FOR THE OPALIZATION OF GLASS

This invention is a method for the opalisation of a glass which is used in automatic forming machines, herein referred to as "automatic machines".

Opal glass means, as is well known, a glass that transmits light but spreads the transmitting rays evenly in different directions. The opalisation is based on small particles in the glass whose refractive index is different from that of the basic glass itself, or on the microscopic gas bubbles in the glass.

The opalisation can be performed by adding fluorides, usually cryolite, phosphates, usually apatite, or stannic oxides, titania, or zirconia into the raw material mixture before it is melted. Some other substances can also be used, e.g. sulphates, when the glass is opalized only by the effect of the light, or arsenic oxide is possible as well.

The raw material mixture is usually melted in a large melting furnace from which several automatic machines can be fed through so called forehearths. If the production of opal glass is desired, the raw material mixture to be melted in the furnace must be composed so that it gives opal glass, and then all the automatic machines are used only for the manufacturing of opal glass articles. For certain commercial reasons, however, it is desirable that only one or a few automatic machines could be used for the production of opal glass articles without the change in the articles produced by other machines and without the necessity of changing the composition of the glass to be melted in the furnace.

In the manufacturing of coloured glass it is well known that the colouring can be carried out in the forehearth situated between the furnace and the automatic machine. This is done as follows: at the beginning of the forehearth the required small quantity of so called frits or colour concentrates is added into the molten glass coming from the furnace. The frits or the colour concentrates are compounds of readily melting glass and various colouring metal oxides. The frits of the colour concentrates are added in solid state, i.e. as flakes or grains. After the adding stage the molten glass in the forehearth is stirred, which can be done either mechanically by ceramic propellers or electrically by electrodes. Thus it is possible to manufacture glass articles in various colours with different automatic machines although the basic glass in the furnace remains unchanged.

In spite of the fact that the above described continuous method for manufacturing of coloured glass articles has been well known, the branch specialists—such as manufacturers of furnaces, forehearths, frits or colour concentrates, and colouring equipment—have been under the impression that the continuous manufacturing of opal glass between the furnace and the automatic machine is not possible, because the phase separation or formation of microscopic gas bubbles required for opalisation cannot be accomplished in a forehearth. The object of this invention is to create a continuous method for the opalisation of glass in a forehearth so that opal glass articles can be produced by only one or a few automatic machines while the other automatic machines which are fed from the same furnace can produce glass articles of another glass material. According to the invention in question this is carried out as follows:

The opalescent compound or composition is added into the molten glass—flint or coloured—coming from the furnace, in the forehearth situated between the furnace and the automatic machine. After this, the temperature of glass is adjusted so that the opalescence takes place either before the automatic machine or latest during the annealing which is carried out after the automatic machine process.

As the opalescent agent it is possible, according to the invention to use phosphates and/or fluorides and/or sulphates. It is advantageous to use phosphates, such as sodium dihydrophosphate, calcium phosphate, zinc phosphate or magnesium phosphate, although other phosphates are practicable as well.

Besides phosphate, the opalescent agent can also include boron, e.g. in the form of boric acid or borax. The boron may be used in order to lower the temperature required by the opalescence reaction.

In order to accelerate the opalescence reaction, it is possible to add into the opalescent compound small amounts, maximum 5% by weight, of fluoride, e.g. sodium fluoride.

In order to regulate the amount of nucleation centers, the shape of the crystals, the speed of crystal growing and the growing directions, it is possible to add small amounts, maximum 5% by weight, of titania, zirconia, or vanadium oxide, or various compound of them. In this way, known as it is, it is possible to bring about either few rapidly growing opalescent crystals or several slowly growing opalescent crystals. Thus the physical characteristics of opal glass can be influenced, e.g. the thermal expansion coefficient.

The opalescent agent can, according to the invented method, be added into the molten glass in the forehearth either as such, i.e. solid finely powdered composition, or it can be melted separately and added molten into the molten glass running in the forehearth. It is also possible to proceed so that the opalescent compound is first melted separately, then cooled, ground and screened in order to obtain the suitable grain size. This compound is then added into the molten glass. An advantageous amount of the opalescent compound to be added is 10–20% of the molten glass.

In spite of how the opalescent agent is added, the molten glass must be vigorously stirred during the adding stage or immediately after it, in order to make the opalescent compound to mix at once with the molten glass. If it is not done properly, the compound may remain floating on the molten glass and partially decompose so that no opalescence takes place, or at least the result remains unsatisfactory.

The temperature of the basic glass must be high enough to enable the dissolution of the opalescent compound in the molten glass. This temperature depends, of course, on the composition of the basic glass. If its composition corresponds to e.g. that of packaging or household glass, the mixing temperature may be about 1250°–1300° C. when the opalescent agent includes boron in addition to phosphate. If no borium is involved, the mixing temperature for the above mentioned basic glass must be at least about 1350° C. Borosilicate glass instead requires a considerably higher mixing temperature.

After the mixing, the temperature must be lowered to that area, where the phase separation takes place at a required speed, before the glass comes to the automatic machine. For the above mentioned packaging or household glass, this temperature area is between 1300° and 1100° C. The grade of opalescence can be influenced by aid of the shape of the temperature gradient, and thus the opal glass of required quality can be obtained. The required temperature gradient, instead, can be formed by regulating besides the temperature also the the retardance of the molten glass in the forehearth after the adding of the opalescent compound. The retardance may vary from 30 minutes to 6 hours. It is also possible to adjust the lowering of the temperature so that the opalescence takes place as late as during the forming stage in the automatic machine, or even during the annealing stage following the forming stage.

The following examples are given in order to clarify the invention:

EXAMPLE 1

Basic glass to be melted in the furnace, for production of packaging and household glass articles, with either of the following compositions:

|  | Composition A. | Composition B. |
|---|---|---|
| $SiO_2$ | 72.5% | 72.5% |
| $Na_2O$ | 13.9% | 13.8% |
| $K_2O$ | 0.8% | 0.8% |
| MgO | 0.7% | 0.7% |
| CaO | 10.4% | 10.4% |
| $Al_2O_3$ | 1.6% | 1.6% |
| $Fe_2O_3$ | 0.03–0.07% | 0.04% |
| $Cr_2O_3$ | — | 0.14% |
| CoO | — | 0.02% |

The basic glass with the composition A is mainly flint while B is green.

Molten glass was led from the furnace to the forehearth situated between the furnace and the automatic machine. The temperature of the glass was kept at 1350° C. in the forehearth. Six percent sodium dihydrophosphate, calculated as $P_2O_5$, was added into the forehearth and the glass was vigorously stirred simultaneously. After the adding the temperature of the glass was lowered to 1100° C. during 5 hours, and the glass was led, as usual, to the automatic machine, and the automatically formed products were led further to the annealing lehr in the normal way.

EXAMPLE 2

The same basic glass was used in Example 1. The molten glass in the forehearth was kept in the temperature of 1300° C., and 13% of the opalescent agent was added. The compound consisted of equal amounts of sodium dihydrophosphate and boric acid. After the adding the glass temperature was lowered to 1100° C. during 5 hours, after which the process continued as in Example 1.

EXAMPLE 3

The procedure was the same as in Example 1, except that the sodium dihydrophosphate used as the opalescent agent included additionally 2% sodium fluoride.

EXAMPLE 4

The procedure was the same as in Example 1, except that the sodium dihydrophosphate used as the opalescent agent included additionally 2% titania.

EXAMPLE 5

The procedure was the same as in Example 1, except that the sodium dihydrophosphate used as the opalescent agent included additionally 2% sodium fluoride and 2% titania.

EXAMPLE 6

The procedure was the same as in Example 2, except that the opalescent agent included additionally 2% sodium fluoride.

EXAMPLE 7

The procedure was the same as in Example 2, except that the opalescent agent included additionally 2% titania.

EXAMPLE 8

The procedure was the same as in Example 2, except that the opalescent agent included additionally 2% sodium fluoride and 2% titania.

I claim:

1. A method for the opalization of flint or coloured packaging and household glass to be used in an automatic forming machine, comprising feeding molten base glass from a glass furnace to a forehearth situated between the furnace and the forming machine, maintaining the base glass in the forehearth at a temperature of at least about 1300° C., adding 10–20% by weight of an opalescent agent into the base glass, dissolving the opalescent agent in the base glass under continuous stirring, lowering the temperature of the glass to a temperature not less than about 1100° C. for a period of time sufficient to cause opalization, and feeding the glass to the forming machine.

2. The method of claim 1, wherein the temperature of the glass is lowered for a period of time from about 30 minutes to about 6 hours.

3. The method of claim 1, wherein the opalescent agent is added to the base glass in a solid, finely divided state obtained by melting the components of the opalescent agent, solidifying the melt by cooling grinding the solid composition, and screening.

4. The method of claim 1, wherein the opalescent agent is separately melted and added to the base glass in molten state.

5. The method of claim 1, wherein the opalescent agent comprises a phosphate, fluoride, or sulphate, or a mixture thereof.

6. The method of claim 5, wherein the opalescent agent comprises a phosphate.

7. The method of claim 6, wherein the opalescent agent further includes boron in the form of boric acid or borax.

8. The method of claim 7, wherein the opalescent agent comprises sodium dihydrophosphate and boric acid in the ratio of 1:1.

9. The method of claim 6, wherein the opalescent agent comprises sodium dihydrophosphate.

10. The method of claim 8, wherein the opalescent agent further includes sodium fluoride in an amount up to about 5% by weight.

11. The method of claim 9, wherein the opalescent agent further includes titania, zirconia, vanadium oxide, or a composition thereof in an amount up to about 5% by weight.

12. The method of claim 6, wherein the phosphate comprises sodium dihydrophosphate, calcium phosphate, zinc phosphate, magnesium phosphate, or a composition thereof.

* * * * *